US009141024B2

(12) United States Patent
Numata

(10) Patent No.: US 9,141,024 B2
(45) Date of Patent: Sep. 22, 2015

(54) EXPOSING DEVICE AND IMAGE FORMING APPARATUS

(71) Applicant: CANON KABUSHIKI KAISHA, Tokyo (JP)

(72) Inventor: Aihiko Numata, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/146,289

(22) Filed: Jan. 2, 2014

(65) Prior Publication Data

US 2014/0192384 A1 Jul. 10, 2014

(30) Foreign Application Priority Data

Jan. 9, 2013 (JP) ................................ 2013-002038

(51) Int. Cl.
*H04N 1/40* (2006.01)
*G03G 15/043* (2006.01)

(52) U.S. Cl.
CPC .................................... *G03G 15/043* (2013.01)

(58) Field of Classification Search
CPC .......... G06K 7/10732; G06K 7/10594; G06K 7/10554; G06K 7/10683; G06K 7/10; H01S 5/4025; H01S 3/13; H01S 3/1307; G02B 26/10
USPC ............ 358/1.7–1.8, 2.1, 296, 300; 359/237, 359/238, 245, 279; 398/188
See application file for complete search history.

(56) References Cited

U.S. PATENT DOCUMENTS

| | | | | |
|---|---|---|---|---|
| 5,233,582 A * | 8/1993 | Tanno et al. | ............... | 369/44.23 |
| 7,327,471 B2 * | 2/2008 | Tiemann | ....................... | 356/519 |
| 2006/0054606 A1 * | 3/2006 | Amako | .................... | 219/121.73 |
| 2012/0134669 A1 * | 5/2012 | Xu et al. | ......................... | 398/38 |

FOREIGN PATENT DOCUMENTS

| | | |
|---|---|---|
| JP | 2004-098289 | 4/2004 |
| JP | 2011-025460 | 2/2011 |
| WO | WO 2008136992 A3 * | 2/2009 |

* cited by examiner

*Primary Examiner* — Thomas D Lee
*Assistant Examiner* — Stephen M Brinich
(74) *Attorney, Agent, or Firm* — Fitzpatrick, Cella, Harper & Scinto

(57) ABSTRACT

Provided is an exposing device capable of enhancing usage efficiency of light and preventing degradation of imaging property due to a misalignment with a photosensitive drum. The exposing device includes: a laser array including multiple lasers arranged in a predetermined direction; and an optical system guiding light emitted from the each of the multiple lasers to a photosensitive member and focusing the light on the photosensitive member, in which the optical system includes multiple phase modulation elements to decrease an added phase lag in proportion to distance from a center axis that is defined by a principal light beam emitted from the each of the multiple lasers.

21 Claims, 10 Drawing Sheets

EXPOSING DEVICE AND IMAGE FORMING APPARATUS

BACKGROUND OF THE INVENTION

1. Field of the Invention

The present invention relates to an exposing device and an image forming apparatus, and more particularly, to an exposing device (printer head) to be used for an electrophotographic copier, printer, facsimile, and the like, and to an image forming apparatus including the exposing device.

2. Description of the Related Art

Hitherto, an image forming apparatus using an electrophotographic method has been known, which includes an exposing device (printer head) arranged above a circumferential surface of a photosensitive drum that is a member to be exposed with light. A light emitting element array of LEDs or the like is provided in the printer head.

FIG. 11 is a schematic diagram of a related art image forming apparatus 1000 disclosed in Japanese Patent Application Laid-Open No. 2004-098289.

The image forming apparatus 1000 includes a photosensitive drum 1010 and a printer head (optical writing head) 1020 arranged facing the photosensitive drum 1010.

Light output from multiple LEDs (light source) 1030 arranged in the printer head 1020 is caused to pass through an erecting equal magnification imaging system such as a rod lens array and imaged on the photosensitive drum 1010, thus exposing the photosensitive drum 1010 with light.

The rod lens array includes a large number of lens elements 1040 arranged in an array and configured to perform the erecting equal magnification imaging so that the light output from the multiple LEDs 1030 is imaged on the photosensitive drum 1010.

In the optical writing head 1020 of the related art image forming apparatus 1000, the light source 1030 that does not have a spatial coherence, such as an LED, is used.

In general, a divergence angle of light emitted from a light source that does not have the spatial coherence is wide, and hence the light emitted from a single light source 1030 is input to multiple optical systems for forming a spot.

For this reason, in order to guide the light from the light source 1030 to the photosensitive drum 1010, the erecting equal magnification imaging system such as the rod lens array (lens elements 1040) has been used as an optical system. However, the light entering a gap of the rod lens array (lens elements 1040) is not guided to the photosensitive drum 1010, and hence the usage efficiency of the light is not sufficient.

Further, when the printer head 1020 and the photosensitive drum 1010 are arranged close to each other to increase the usage efficiency of the light, a focal depth of the erecting equal magnification imaging system becomes small, causing a problem in that imaging property of the erecting equal magnification imaging system is changed due to a misalignment caused by a vibration or the like of the photosensitive drum 1010.

SUMMARY OF THE INVENTION

The present invention has been made in view of the above-mentioned problem, and it is an object of the present invention to provide an exposing device capable of enhancing usage efficiency of light and preventing degradation of imaging property due to a misalignment with a photosensitive drum, and to provide an image forming apparatus including the exposing device.

According to one embodiment of the present invention, there is provided an exposing device, including:

a laser array including multiple lasers arranged in a predetermined direction; and an optical system guiding light emitted from the each of the multiple lasers to a photosensitive member and focusing the light on the photosensitive member, in which the optical system includes multiple phase modulation elements to decrease an added phase lag in proportion to distance from a center axis that is defined by a principal light beam emitted from the each of the multiple lasers.

Further, according to one embodiment of the present invention, there is provided an image forming apparatus, including the above-described exposing device.

Further features of the present invention will become apparent from the following description of exemplary embodiments with reference to the attached drawings.

DESCRIPTION OF THE EMBODIMENTS

Exemplary embodiments of the present invention are described below.

First Embodiment

Figure 1:
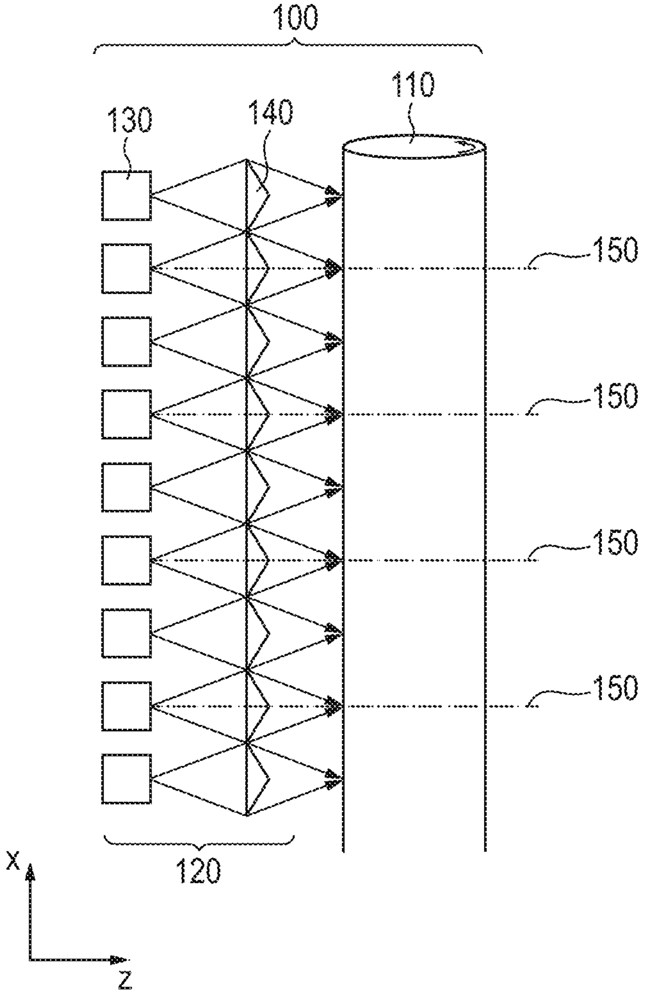
FIG. 1 is a schematic diagram illustrating a configuration example of an exposing device and an image forming apparatus including the exposing device according to a first embodiment of the present invention.

A configuration example of an exposing device and an image forming apparatus including the exposing device according to a first embodiment of the present invention is described with reference to FIG. 1.

An exposing device (printer head) 120 according to the first embodiment is arranged facing a cylindrical photosensitive drum 110.

An image forming apparatus 100 includes the cylindrical photosensitive drum 110, the printer head (exposing device) 120 configured to be arranged facing the photosensitive drum 110, a developing device (not shown), a transfer device (not shown), and the like.

The printer head 120 includes a laser array including multiple lasers 130 arranged at regular intervals in a longitudinal direction (x direction) of the photosensitive drum 110, and an optical system for forming respective spots of light beams from the lasers 130 with one-to-one correspondence.

Light emitted from each of the lasers 130 is guided to a drum surface by the optical system and forms a spot on the drum surface.

The optical system includes phase modulation elements 140 that decrease an added phase lag in proportion to distance from a center axis 150 that is defined by a principal light beam of the light emitted from each of the lasers 130.

With this configuration, the image forming apparatus 100 having high usage efficiency of the light and resistance to a misalignment can be provided. The reason therefor is described below.

As described above, in the related art image forming apparatus, a light source that does not have a spatial coherence, such as an LED, has been used.

Therefore, in order to guide the light having a wide divergence angle to the photosensitive drum, it is necessary to use an erecting equal magnification imaging optical system such as a rod lens array.

However, the light entering a gap between the lens elements is not guided to the photosensitive drum, and hence the usage efficiency of the light is not sufficient.

On the other hand, in the printer head 120 according to the first embodiment, the lasers 130 having a spatial coherence are used as the light source.

The light emitted from each of the lasers 130 has the spatial coherence, and hence the divergence angle of the light is narrow. Therefore, the light emitted from a single laser 130 can be focused by a single optical system that has one-to-one correspondence with the laser 130.

In the printer head 120 according to the first embodiment, the phase modulation elements 140 that decrease the added phase lag in proportion to the distance from the center axis that is defined by the principal light beam of the light emitted from each of the lasers 130 are used as the optical system.

Figure 2A:
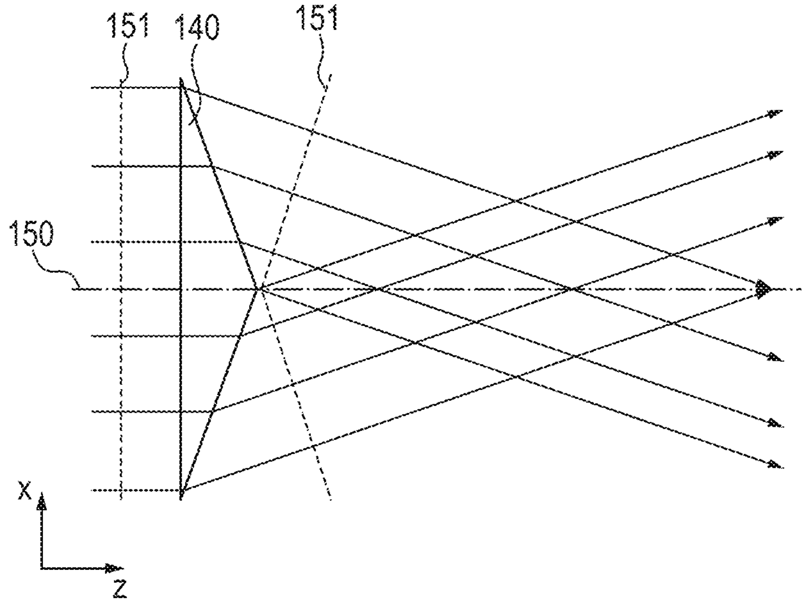
FIG. 2A is a schematic diagram illustrating propagation of light entering a phase modulation element of the exposing device according to the first embodiment of the present invention.

FIG. 2A illustrates propagation of the light when the light having the spatial coherence is input to the phase modulation element 140.

In FIG. 2A, an arrow of a solid line indicates a light beam, and a dotted line perpendicular to the light beam indicates a wavefront 151. The wavefront of the light that has passed through an upper half of the phase modulation element 140 and the wavefront of the light that has passed through a lower half of the phase modulation element 140 are bent in a concave cone shape toward a traveling direction of the light due to the phase lag added by the phase modulation element 140.

Therefore, the upper light and the lower light propagate with inclined angles of the same magnitude opposite to each other with respect to the center axis 150. Optical path lengths of the upper light and the lower light are equal to each other on the center axis, and hence a spot having a large focal depth can be formed on the center axis.

Figure 2B:
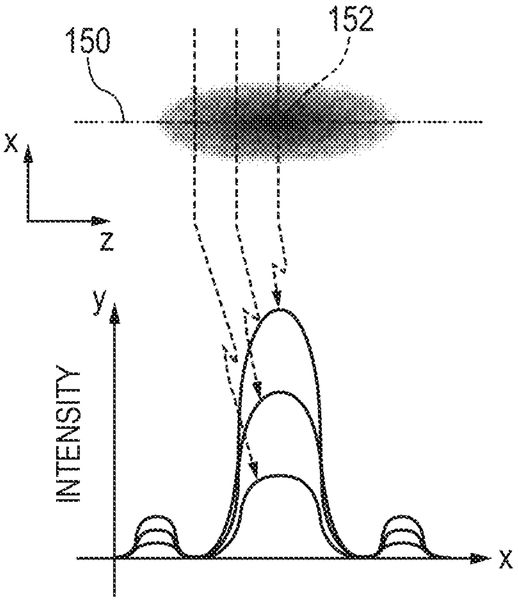
FIG. 2B is a schematic diagram illustrating a spot profile formed by the phase modulation elements according to the first embodiment of the present invention.

FIG. 2B is a schematic diagram illustrating a spot profile formed by the phase modulation elements 140.

The optical intensity profile of the spot formed by the phase modulation elements 140 has an xy-plane profile of a Bessel function with a shape monotonically decreasing as being shifted from a focal point center 152 in a z direction.

In this manner, in the image forming apparatus 100 according to the first embodiment, the laser having the spatial coherence is used as the light source, and the optical system having one-to-one correspondence with each of the lasers is used.

Further, as the optical system, the phase modulation elements 140 are used, which decrease the added phase lag in proportion to the distance from the center axis.

Therefore, the first embodiment can achieve both enhancement of the usage efficiency of the light and sufficient focal depth.

In the present invention, the reason why both the enhancement of the usage efficiency of the light and the sufficient focal depth can be achieved is because the above-mentioned configuration has been found by the inventors.

That is, a configuration has been found by the inventors, which uses the lasers having the spatial coherence as the light source and focuses the light from each of the lasers by a single optical system including the phase modulation element having one-to-one correspondence with each of the lasers.

If the lasers having the spatial coherence are simply applied as the light source or the phase modulation elements are simply applied to the related art image forming apparatus 1000, it is not possible to achieve both the enhancement of the usage efficiency of the light and the sufficient focal depth.

Even if the light source having the spatial coherence is simply used as the light source in the erecting equal magnification imaging system such as the rod lens array (lens elements 1040) of the related art image forming apparatus, the following disadvantages may occur.

That is, when light from a single light source is input to multiple lens elements, the optical path length of the light having passed through the multiple lens elements differs, and hence the spot profile formed by the light may be distorted due to interference.

Further, even if the phase modulation elements 140 are simply applied to the optical system, when the light that does not have the spatial coherence is input, the light having passed through the phase modulation elements 140 generates no interference, and hence the spot having a large focal depth cannot be formed.

In this manner, if the lasers are used exclusively or the phase modulation elements are used exclusively in the related art image forming apparatus 1000, the disadvantages may occur in each case.

As in the present invention, with the configuration including the lasers and the phase modulation elements each having one-to-one correspondence with each of the lasers, the advantages of both the enhancement of the usage efficiency of the light and the sufficient focal depth are achieved.

Semiconductor lasers using a general compound semiconductor such as AlGaAs, InP, and InGaN may be used as the lasers 130.

The semiconductor lasers may be edge-emitting lasers or surface-emitting lasers.

However, from the aspects of easily forming an array and easily achieving a small divergence angle of a beam, the surface-emitting lasers are preferred. As the divergence angle of the beam decreases, it is easier to focus the light emitted from a single laser 130 with a single optical system.

Figure 3:
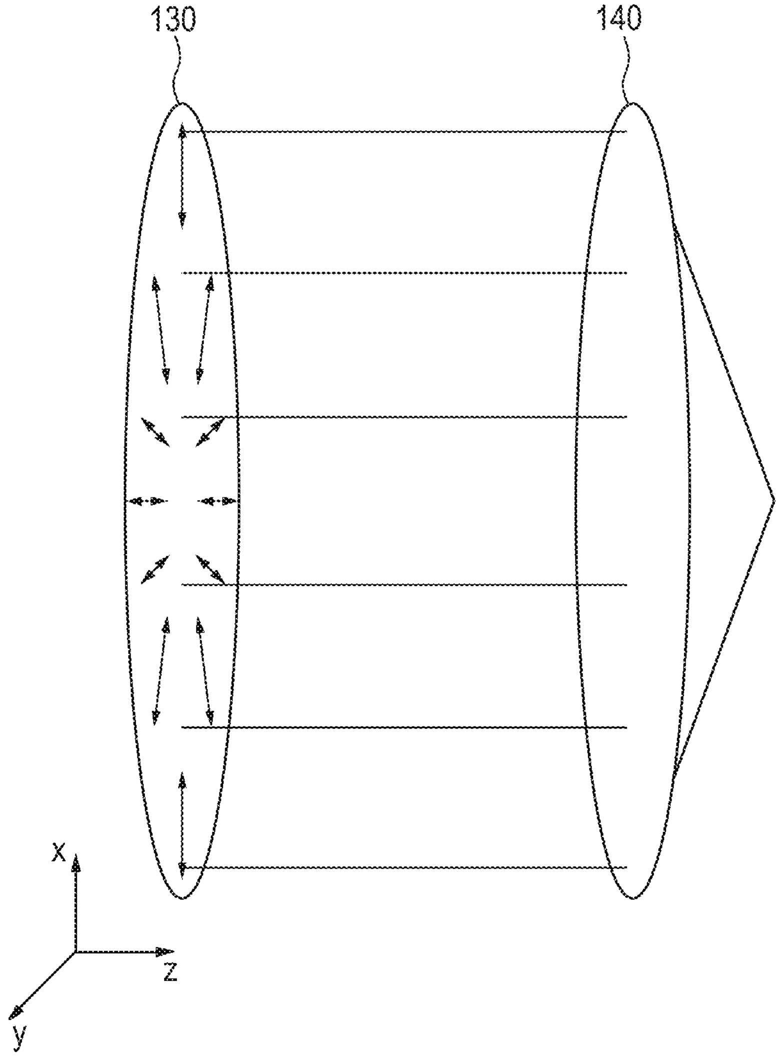
FIG. 3 is a schematic diagram illustrating a configuration example in which a radially polarized beam is used in the exposing device according to the first embodiment of the present invention.

Further, it is more preferred that a polarization of the beam emitted from each of the lasers 130 be a radially polarized beam as illustrated in FIG. 3.

In the radially polarized beam, an oscillation direction of an electric field of the beam is parallel to a radial direction.

An arrow of a solid line in FIG. 3 indicates the oscillation direction component of the electric field of the beam.

When the radially polarized beam is focused by the phase modulation element 140, the spot diameter of the beam on the photosensitive drum 110 can be reduced, compared to a case where a linearly polarized beam is focused by the phase modulation element 140. This enables image quality of the image forming apparatus 100 to be enhanced by using the radially polarized beam.

The radially polarized beam may be formed by, for example, using a distributed feedback surface-emitting layer including a two-dimensional photonic crystal near an active layer.

The two-dimensional photonic crystal can be implemented by multiple cylindrical holes periodically formed in a semiconductor layer, and has a periodic refractive index profile in a two-dimensional manner. Light generated from the active layer is subjected to diffraction due to the periodic refractive index profile of the photonic crystal while propagating in an in-plane direction with a waveguide mode, and generates a laser oscillation by forming a standing wave. The laser oscillation light is diffracted outside the plane due to the photonic crystal and output in a direction perpendicular to a plane of the photonic crystal.

A configuration example of the photonic crystal surface-emitting laser that emits the radially polarized beam according to the first embodiment is described below with reference to FIGS. 4A to 4C.

Figure 4A:
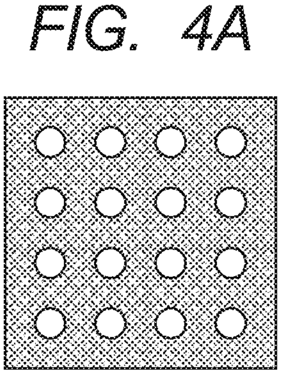
FIG. 4A is a schematic diagram illustrating a configuration example of a photonic crystal surface-emitting laser that emits the radially polarized beam according to the first embodiment of the present invention.

FIG. 4A is a schematic diagram illustrating an example of using a square lattice photonic crystal with a lattice point defined by a cylindrical hole. So long as the square lattice includes a shape of the lattice point having a four-fold rotational symmetry, the radially polarized beam can be emitted.

Figure 4B:
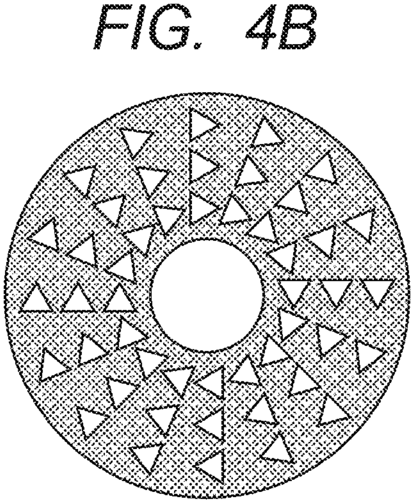
FIG. 4B is a schematic diagram illustrating a configuration example of the photonic crystal surface-emitting laser that emits the radially polarized beam according to the first embodiment of the present invention.

FIG. 4B is a schematic diagram illustrating an example of using a photonic crystal including square lattices arranged in an annular shape with a lattice point defined by a hole of a triangle pole shape.

The radially polarized beam may be formed by, for example, providing a polarization adjustment layer on an output side of the laser, in which a wave plate having a phase lag axis rotating along a circumferential direction is arranged.

Figure 4C:
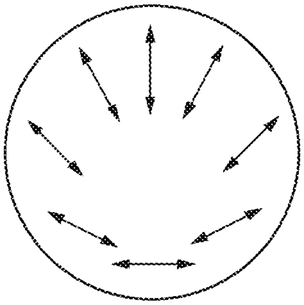
FIG. 4C is a schematic diagram illustrating a configuration example of the photonic crystal surface-emitting laser that emits the radially polarized beam according to the first embodiment of the present invention.

For example, a half-wave plate having the phase lag axis rotating along the circumferential direction may be combined with a surface-emitting layer that emits the linearly polarized beam, as illustrated in FIG. 4C.

An arrow in FIG. 4C indicates the phase lag axis of the wave plate.

The emission wavelength of the laser is such a wavelength that a latent image can be formed on the photosensitive drum. For example, when amorphous silicon is used as a material of the photosensitive drum, a light source having a wavelength of 300 nm or longer and 800 nm or shorter can be used.

A configuration example of the phase modulation element 140 according to the first embodiment of the present invention is described below with reference to FIGS. 5A to 5E. An axicon lens or a gradient index lens formed of a transparent material such as $SiO_2$ or plastic can be used as the phase modulation element 140 according to the first embodiment.

Figure 5A:
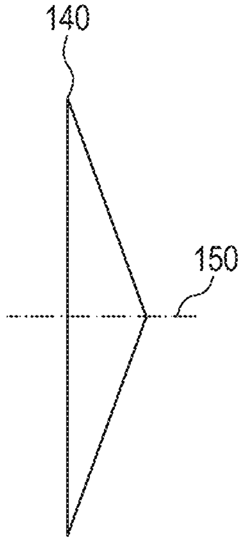
FIG. 5A is a schematic diagram illustrating a configuration example of the phase modulation element according to the first embodiment of the present invention.

The axicon lens 140 is a lens having a cone-like plane shape, as illustrated in FIG. 5A.

An axis of a vertical line drawn from the top of the cone of the axicon lens to the bottom matches the center axis 150 so that the largest phase lag is added to a portion along the center axis and the added phase lag is decreased in proportion to the distance from the center axis.

Figure 5B:
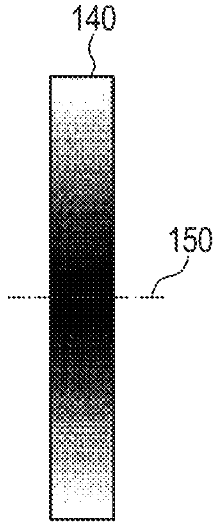
FIG. 5B is a schematic diagram illustrating a configuration example of the phase modulation element according to the first embodiment of the present invention.

FIG. 5B is a schematic diagram of an example of the gradient index lens. The gradient index lens 140 includes a high refractive index medium and a low refractive index medium.

A proportion of the high refractive index medium increases as approaching the center axis 150, and a proportion of the low refractive index medium increases along with increase in distance from the center axis 150 so that the added phase lag is decreased in proportion to the distance from the center axis 150.

For example, there may be used a combination of SiN having a refractive index of 1.8 as the high refractive index medium and $SiO_2$ having a refractive index of 1.5 as the low refractive index medium.

Figure 5C:
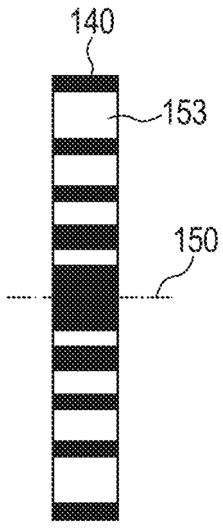
FIG. 5C is a schematic diagram illustrating a configuration example of the phase modulation element according to the first embodiment of the present invention.

FIG. 5C is a schematic diagram of another example of the gradient index lens. The gradient index lens 140 includes a gap 153 in a high refractive index medium at an interval of about 1/10 of the emission wavelength of the laser.

A proportion of the gap 153 decreases as approaching the center axis 150, and the proportion of the gap 153 increases along with increase in distance from the center axis 150 so that the added phase lag is decreased in proportion to the distance from the center axis 150.

Figure 5D:
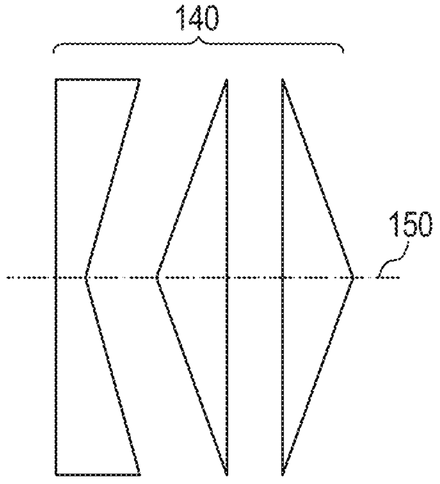
FIG. 5D is a schematic diagram illustrating a configuration example of the phase modulation element according to the first embodiment of the present invention.

The phase modulation element 140 may include a combination of multiple lenses. For example, as illustrated in FIG. 5D, a combination of multiple axicon lenses can be used so long as the added phase lag is decreased in proportion to the distance from the center axis 150.

Figure 5E:
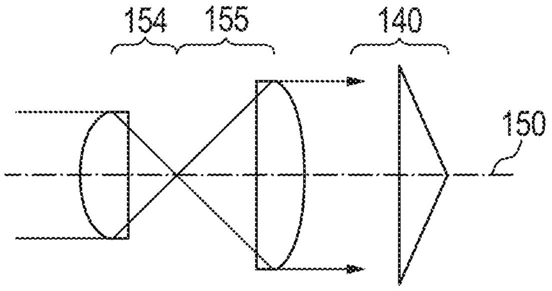
FIG. 5E is a schematic diagram illustrating a configuration example of the phase modulation element according to the first embodiment of the present invention.

As illustrated in FIG. 5E, the optical system may include a combination of an axicon lens and multiple normal lenses. As illustrated in FIG. 5E, through use of an optical system having overlapped focal points of two lenses respectively having focal lengths 154 and 155, the diameter of the beam emitted from the laser can be converted.

With these configurations, the beam emitted from the laser is broadened so that a larger focal depth can be obtained.

Although the cylindrical photosensitive drum 110 is used as the photosensitive member in the first embodiment, a photosensitive member having a shape other than the cylindrical drum can also be used. For example, an image may be formed by exposing a photosensitive member with light on a flat surface. Further, although a laser array in which the multiple lasers 130 are arranged at regular intervals in the longitudinal direction of the photosensitive drum 110 is used in the first embodiment, the lasers 130 can also be arranged at different intervals. However, the arrangement of the lasers 130 at regular intervals provides constant spot intervals on the photosensitive member, and hence it is preferred from the viewpoint of achieving a uniform resolution of the latent image formed on the photosensitive member.

Second Embodiment

A configuration example of an image forming apparatus according to a second embodiment of the present invention is described with reference to FIGS. 6A to 7B.

As illustrated in FIGS. 6A to 7B, an image forming apparatus 200 according to the second embodiment is different from the image forming apparatus 100 according to the first embodiment only in an arrangement direction of lasers 230 and phase modulation elements 240 in a printer head 220.

Figure 6A:
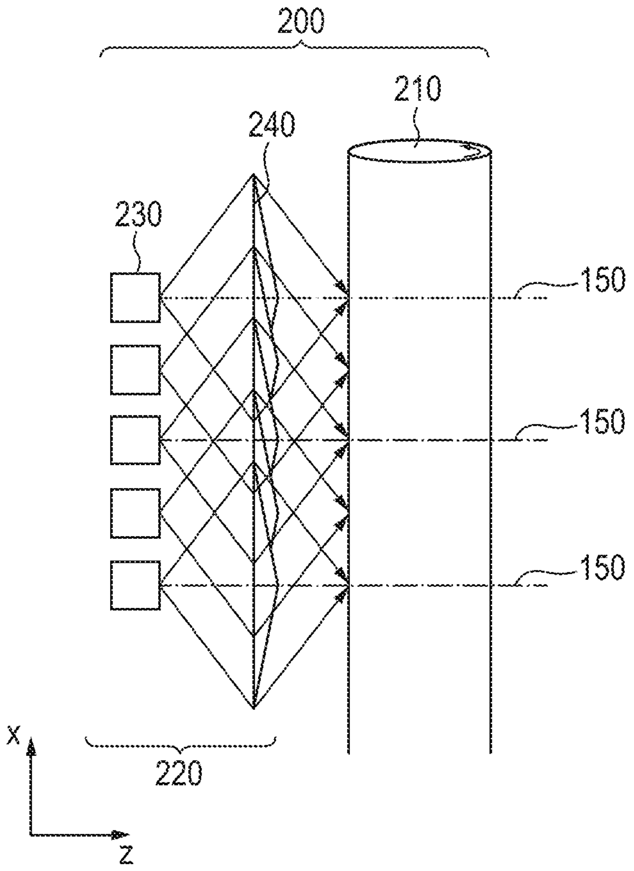
FIG. 6A is a schematic diagram illustrating a configuration example of an image forming apparatus according to a second embodiment of the present invention.
Figure 6B:
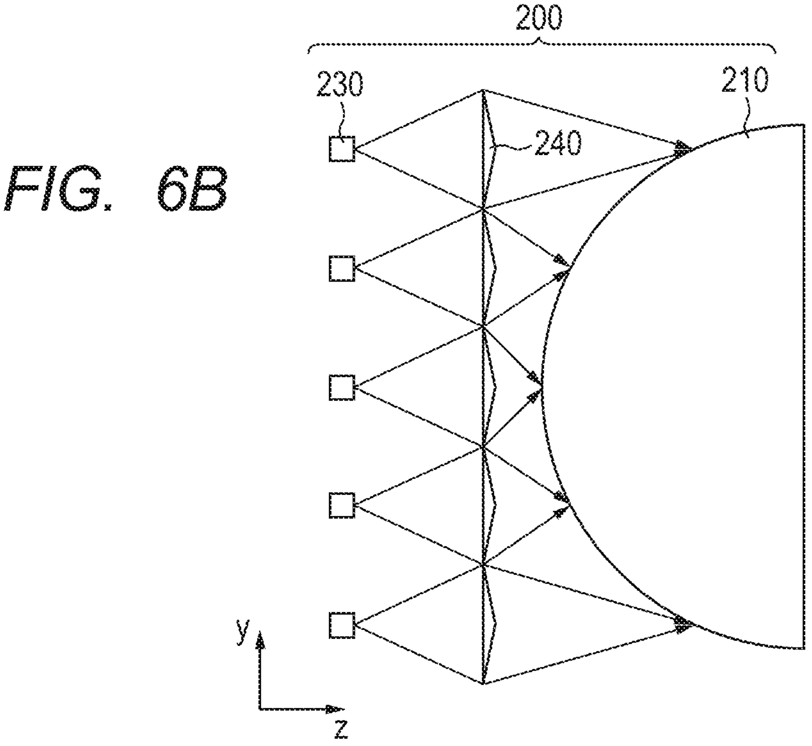
FIG. 6B is a schematic diagram illustrating a configuration example of the image forming apparatus according to the second embodiment of the present invention.

FIGS. 6A and 6B are schematic diagrams illustrating a positional relationship among the lasers, the phase modulation elements, and the photosensitive drum.

FIG. 6A is a view from a lateral direction (y direction) of the photosensitive drum, and FIG. 6B is a view from a longitudinal direction (x direction) of the photosensitive drum.

Figure 7A:
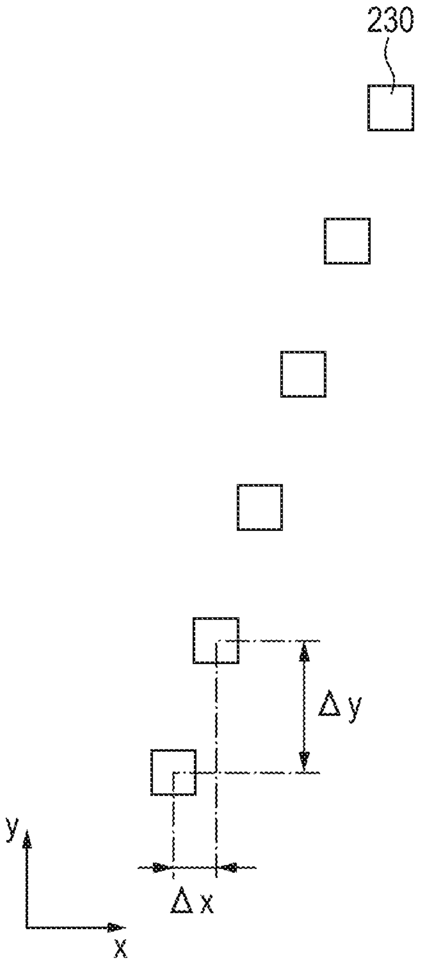
FIG. 7A is a schematic diagram illustrating a configuration example of the image forming apparatus according to the second embodiment of the present invention.
Figure 7B:
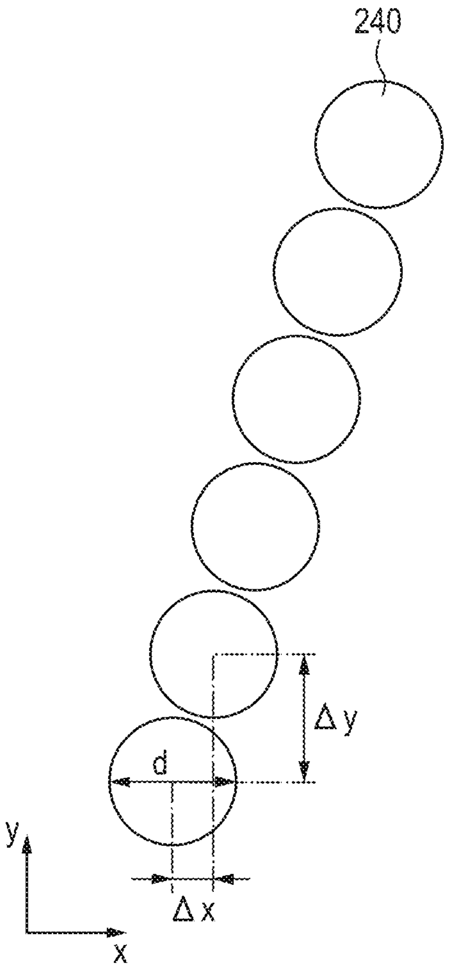
FIG. 7B is a schematic diagram illustrating a configuration example of the image forming apparatus according to the second embodiment of the present invention.

FIGS. 7A and 7B are schematic diagrams illustrating the arrangement direction of the lasers 230 and the phase modulation elements 240 on an xy-plane, respectively.

The lasers 230 are arranged at regular intervals in a longitudinal direction of a photosensitive drum 210 and at predetermined intervals in a lateral direction of the photosensitive drum 210, and an interval Δy in the lateral direction is longer than an interval Δx in the longitudinal direction (see FIG. 7A).

In the same manner, the phase modulation elements 240 each having one-to-one correspondence with each of the lasers 230 are arranged at regular intervals in the longitudinal direction of the photosensitive drum 210 and at predetermined intervals in the lateral direction of the photosensitive drum 210, and a diameter d of the phase modulation element 240 is longer than the interval Δx in the longitudinal direction (see FIG. 7B).

With this configuration, the image forming apparatus 200 can obtain a smaller spot diameter of the light on the photosensitive drum than that of the image forming apparatus 100 according to the first embodiment. Thus, the image forming apparatus 200 is more preferred than the image forming apparatus 100. The reason therefor is described below.

Figure 8B:
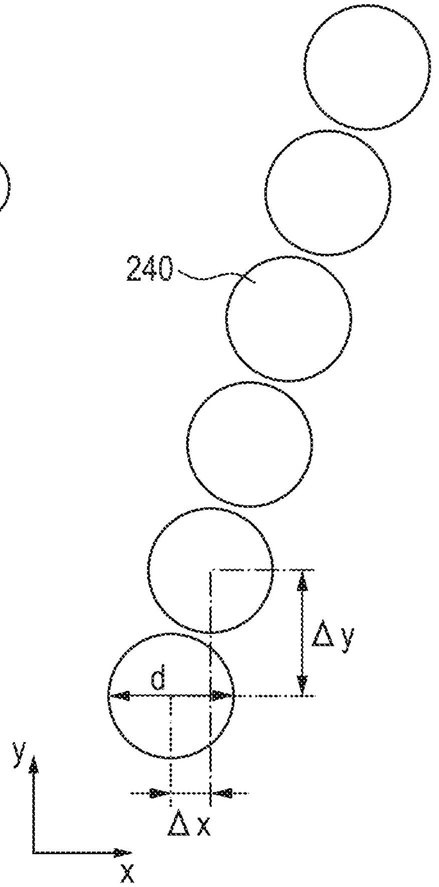
FIG. 8B is a schematic diagram illustrating a relationship between an arrangement and an upper limit of a size of the phase modulation element according to the second embodiment of the present invention.
Figure 8A:
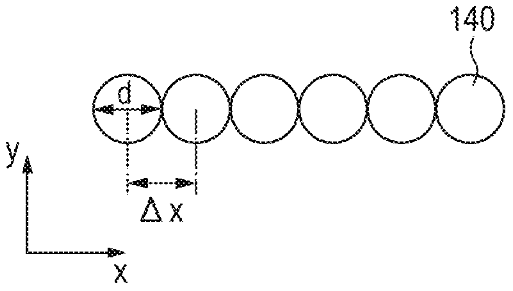
FIG. 8A is a schematic diagram illustrating a relationship between an arrangement and an upper limit of a size of the phase modulation element according to the first embodiment of the present invention.

The size of the phase modulation element is limited by the interval between two adjacent lasers. In the image forming apparatus 100 according to the first embodiment, the phase modulation elements 140 are not overlapped with each other, and hence the diameter of each of the phase modulation elements 140 needs to be equal to or smaller than the interval Δx between the lasers 130 in the longitudinal direction (see FIG. 8A).

On the other hand, in the image forming apparatus 200 according to the second embodiment, the lasers 230 are arranged at predetermined intervals also in the lateral direction, and the interval Δy in the lateral direction is larger than the interval Δx in the longitudinal direction. Thus, the conditions of preventing the phase modulation elements 240 from overlapping with each other can be satisfied when the diameter of each of the phase modulation elements 240 is equal to or smaller than the interval Δy (see FIG. 8B).

Therefore, the image forming apparatus 200 can employ the phase modulation element having a diameter larger than that of the image forming apparatus 100.

In general, as the diameter of the phase modulation element is increased and the phase lag added by the phase modulation element is decreased, the focal depth becomes larger.

Further, as the phase lag added by the phase modulation element is increased, the spot diameter becomes smaller. Therefore, in the image forming apparatus 200 that employs the same spot diameter as that of the image forming apparatus 100, a focal depth larger than that of the image forming apparatus 100 can be obtained.

On the other hand, in the image forming apparatus 200 that employs the same focal depth as that of the image forming apparatus 100, a spot diameter smaller than that of the image forming apparatus 100 can be obtained. As a result, the image forming apparatus 200 can improve the image quality.

In this manner, the image forming apparatus 200 can employ the phase modulation element having a diameter larger than that of the image forming apparatus 100, and hence a larger focal depth can be obtained and the image quality can be improved. Thus, the image forming apparatus 200 is more preferred.

When the lasers 230 are arranged at predetermined intervals in the lateral direction of the photosensitive drum 210 as in the second embodiment, as illustrated in FIG. 6B, distance from the laser 230 to the photosensitive drum 210 differs among the lasers.

Therefore, in order to prevent a distortion of the spot diameter depending on an area of the photosensitive drum 210, an even larger focal depth is required. The image forming apparatus according to the embodiment of the present invention employs the phase modulation elements 240 as the optical system, and hence a sufficient focal depth can be obtained.

Figure 9:
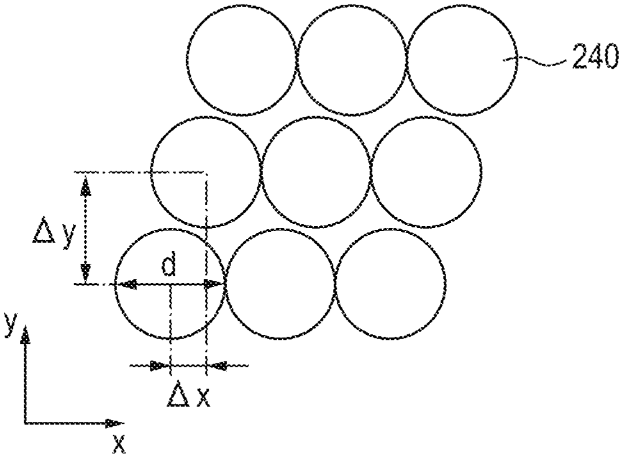
FIG. 9 is a schematic diagram illustrating a modification example of an arrangement of the lasers and the phase modulation elements.

As illustrated in FIG. 9, the lasers 230 and the phase modulation elements 240 may be arranged in a two-dimensional array.

In this case, if the number of lasers arranged in the lateral direction is equal to or larger than a value obtained by dividing the interval Δy in the lateral direction by the interval Δx in the longitudinal direction, adjacent phase modulation elements are not overlapped with each other when the arrangement is folded back.

Through the arrangement of the lasers and the phase modulation elements in a two-dimensional array in the above-mentioned manner, the printer head 220 can be downsized. Thus, such arrangement is preferred.

Figure 10:
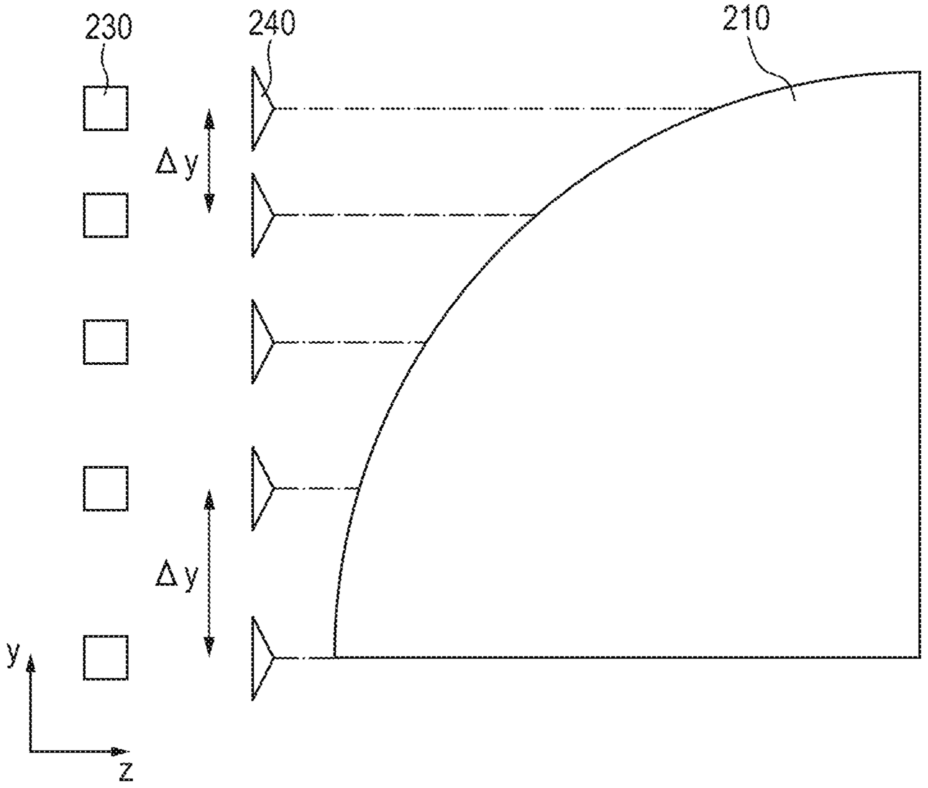
FIG. 10 is a schematic diagram illustrating another modification example of an arrangement of the lasers and the phase modulation elements.
Figure 11:
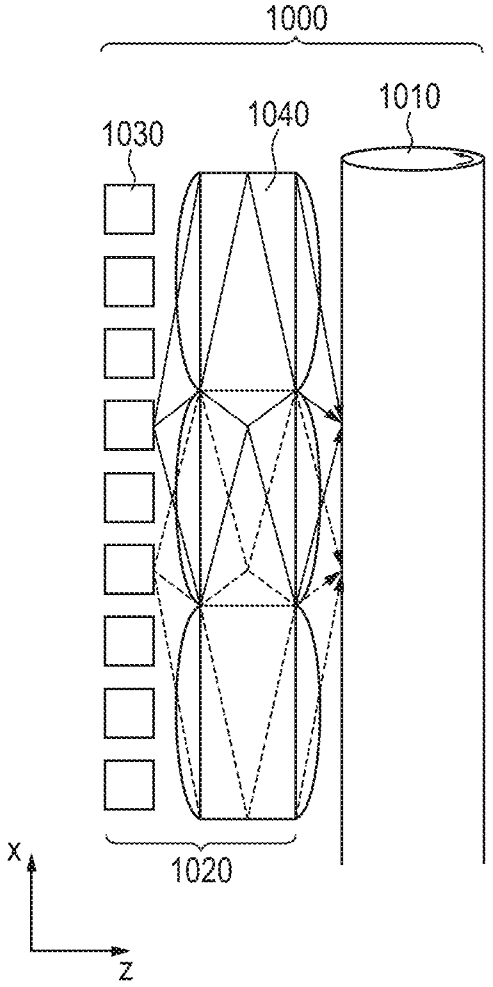
FIG. 11 is a schematic diagram illustrating a configuration of an image forming apparatus according to a related art.

Further, it is preferred that the lasers 230 and the phase modulation elements 240 facing a periphery of the photosensitive drum have a smaller interval Δy in the lateral direction (see FIG. 10).

With this configuration, the spot interval on the photosensitive drum 210 becomes close to a constant interval, and hence a uniform resolution of the latent image can be obtained.

EXAMPLES

Examples of the present invention are described below.

Example 1

An image forming apparatus according to Example 1 represents an example of specific numerical values of the image forming apparatus according to the first embodiment.

The image forming apparatus 100 according to Example 1 includes the cylindrical photosensitive drum 110 having a radius of 10 mm and the printer head 120 arranged facing the photosensitive drum 110.

The printer head 120 includes a light source array including the multiple lasers 130 arranged at an interval of 40 μm in the longitudinal direction of the photosensitive drum 110, and the optical system having one-to-one correspondence with the lasers 130.

Each of the lasers 130 is a surface-emitting laser including an active layer formed of multiple quantum wells of GaInP/AlGaInP, which emits laser light having a wavelength of 680 nm, and a multilayer mirror formed of $Al_{0.9}Ga_{0.1}As/Al_{0.5}Ga_{0.5}As$.

Each of the lasers 130 further includes an oxidation constriction layer having a diameter of 30 μm, and hence a Gaussian beam having a beam waist of 30 μm is emitted from the laser 130.

The optical system includes the axicon lenses 140 each formed of $SiO_2$ having a refractive index of 1.5, with a diameter of 40 μm and an apex angle of 177 degrees. The multiple axicon lenses 140 are arranged at an interval of 40 μm in the longitudinal direction of the photosensitive drum 110 so as to have one-to-one correspondence with the lasers 130.

The spot diameter of the light formed by the image forming apparatus 100 including the lasers and the axicon lenses in the above-mentioned manner is 40 μm, and the focal depth is 1.7 mm. That is, an image forming apparatus that is capable of forming an image of 600 dpi can be provided.

Comparative Example 1

On the other hand, when the related art erecting equal magnification imaging optical system is employed, in order to obtain a spot diameter of 40 μm, the F number of the erecting equal magnification optical system needs to be 23 or smaller.

The focal depth that can be obtained in this case is 0.92 mm or smaller.

This value is obtained when the erecting equal magnification optical system is assumed as a single imaging optical system having no gap therein completely. However, in practice, light entering a gap of the rod lens array does not contribute to the imaging, and hence the focal depth is even smaller than 0.92 mm.

In this manner, by using the image forming apparatus 100 including the lasers and the axicon lenses, an image forming apparatus having high usage efficiency of light and large focal depth can be provided.

Example 2

As Example 2, a configuration example that is different from that of Example 1 is described below.

An image forming apparatus according to Example 2 represents an example of specific numerical values of the image forming apparatus according to the second embodiment.

The image forming apparatus 200 according to Example 2 includes the cylindrical photosensitive drum 210 having a radius of 10 mm and the printer head 220 arranged facing the photosensitive drum 210.

The printer head 220 includes a light source array including the multiple lasers 230 arranged at an interval of 10 μm in the longitudinal direction of the photosensitive drum 210 and an interval of 200 μm in the lateral direction thereof, and the optical system having one-to-one correspondence with the lasers 230.

Further, the arrangement of the light source array is folded back for every 20 lasers in the lateral direction.

Each of the lasers 230 includes the same active layer and multilayer mirror as those of the laser 130 according to Example 1.

However, each of the lasers 230 includes an oxidation constriction layer having a diameter of 200 μm, and hence a Gaussian beam having a beam waist of 200 μm is emitted from the laser 230.

The optical system includes the axicon lenses 240 each formed of $SiO_2$ having a refractive index of 1.5, with a diameter of 200 μm and an apex angle of 169 degrees.

Further, the multiple axicon lenses 240 are arranged at an interval of 10 μm in the longitudinal direction of the photosensitive drum 210 and an interval of 200 μm in the lateral direction thereof so as to have one-to-one correspondence with the lasers 230.

The spot diameter of the light formed by the image forming apparatus 200 including the lasers and the axicon lenses in the above-mentioned manner is 10 μm, and the focal depth is 2.2 mm. That is, an image forming apparatus that is capable of forming an image of 2,400 dpi can be provided. An interval between the lasers 230 most separated in the lateral direction of the photosensitive drum 210 is 4 mm. Among these lasers, distance from the laser 230 to the photosensitive drum 210 differs by 0.8 mm, but falls within a range of the focal depth of 2.2 mm of the image forming apparatus 200.

Comparative Example 2

On the other hand, when the related art erecting equal magnification imaging optical system is employed, in order to obtain a spot diameter of 10 μm, the F number of the erecting equal magnification optical system needs to be 5.8 or smaller.

The focal depth that can be obtained in this case is 0.058 mm. This value is obtained when the erecting equal magnification optical system is assumed as a single imaging optical system having no gap therein completely. However, in practice, light entering a gap of the rod lens array does not contribute to the imaging, and hence the focal depth is even smaller than 0.058 mm.

In this manner, by using the image forming apparatus 200 including the lasers and the axicon lenses, an image forming apparatus having high usage efficiency of light and large focal depth can be provided.

According to the present invention, the exposing device capable of enhancing the usage efficiency of the light and preventing degradation of the imaging property due to a misalignment with the photosensitive drum, and the image forming apparatus including the exposing device can be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-002038, filed Jan. 9, 2013, which is hereby incorporated by reference herein in its entirety.

What is claimed is:

1. An exposing device, comprising:

a laser array including multiple lasers arranged in a predetermined direction; and an optical system guiding light emitted from each of the multiple lasers to a photosensitive member and focusing the light on the photosensitive member, wherein the optical system includes multiple phase modulation elements to decrease a phase lag in proportion to distance from a center axis that is defined by a principal light beam emitted from the each of the multiple lasers.

2. The exposing device according to claim 1, wherein the multiple lasers are arranged in a longitudinal direction of the photosensitive member at regular intervals.

3. The exposing device according to claim 2, wherein:

the multiple lasers are further arranged in a lateral direction of the photosensitive member at predetermined intervals;

an interval between two adjacent lasers in the lateral direction is larger than an interval between the two adjacent lasers in the longitudinal direction; and a radius of the phase modulation element is larger than the interval between two adjacent lasers in the longitudinal direction.

4. The exposing device according to claim 1, wherein:

the multiple lasers are arranged in a two-dimensional array; and a number of the multiple lasers arranged in a lateral direction of the photosensitive member is equal to or larger than a value obtained by dividing an interval between two adjacent lasers in the lateral direction by an interval between two adjacent lasers in a longitudinal direction of the photosensitive member.

5. The exposing device according to claim 3, wherein the multiple lasers comprise lasers facing a periphery of the photosensitive member in the lateral direction at a smaller interval in the lateral direction.

6. The exposing device according to claim 1, wherein the phase modulation element comprises an axicon lens.

7. The exposing device according to claim 1, wherein the phase modulation element comprises a gradient index lens.

8. The exposing device according to claim 1, wherein the laser comprises surface-emitting laser.

9. The exposing device according to claim 8, wherein the surface-emitting laser comprises a light source to emit a radially polarized beam.

10. The exposing device according to claim 9, wherein the surface-emitting laser comprises a distributed feedback surface-emitting laser including an active layer and a two-dimensional photonic crystal.

11. The exposing device according to claim 10, wherein:

the two-dimensional photonic crystal comprises a square lattice; and a shape of a lattice point thereof has a four-fold rotational symmetry.

12. The exposing device according to claim 1, wherein each of the multiple phase modulation elements corresponds to different one of the multiple lasers.

13. The exposing device according to claim 2, wherein the multiple lasers are further arranged in a lateral direction of the photosensitive member at predetermined intervals.

14. The exposing device according to claim 1, wherein the multiple lasers are arranged in a two-dimensional array.

15. The exposing device according to claim 7, wherein:

the gradient index lens includes a high refractive index medium and a low refractive index medium, a proportion of the high refractive index medium increases as approaching the center axis, and a proportion of the low refractive index medium increases along with increase in distance from the center axis.

16. The exposing device according to claim 7, wherein:

the gradient index lens includes a gap in a high refractive index medium, a proportion of the gap decreases as approaching the center axis and increases along with increase in distance from the center axis.

17. The exposing device according to claim 1, wherein the multiple phase modulation elements comprise multiple lenses.

18. The exposing device according to claim 1, wherein the multiple phase modulation elements comprise multiple axicon lenses.

19. The exposing device according to claim 1, wherein the multiple phase modulation elements are provided to and aligned with the multiple lasers in one-to-one correspondence.

20. An image forming apparatus, comprising:

a photosensitive member;

a laser array including multiple lasers arranged in a predetermined direction; and an optical system guiding light emitted from each of the multiple lasers to the photosensitive member and focusing the light on the photosensitive member, so as to form a latent image on the photosensitive member, wherein the optical system includes multiple phase modulation elements to decrease a phase lag in proportion to distance from a center axis that is defined by a principal light beam emitted from the each of the multiple lasers.

21. An exposing device, comprising:

a laser array including multiple lasers arranged in a predetermined direction; and an optical system guiding light emitted from each of the multiple lasers to a photosensitive member and focusing the light on the photosensitive member, wherein the optical system includes multiple phase modulation elements to decrease a phase lag in proportion to distance from an optical axis of each of the multiple phase modulation elements.

* * * * *